United States Patent
Ishida et al.

(10) Patent No.: US 9,059,442 B2
(45) Date of Patent: Jun. 16, 2015

(54) FUEL CELL

(71) Applicant: HONDA MOTOR CO., LTD., Minato-Ku, Tokyo (JP)

(72) Inventors: Kentaro Ishida, Utsunomiya (JP); Shuhei Goto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 339 days.

(21) Appl. No.: 13/792,776

(22) Filed: Mar. 11, 2013

(65) Prior Publication Data

US 2013/0244134 A1  Sep. 19, 2013

(30) Foreign Application Priority Data

Mar. 19, 2012  (JP) .................................. 2012-061601

(51) Int. Cl.
| | | |
|---|---|---|
| *H01M 2/38* | (2006.01) | |
| *H01M 8/10* | (2006.01) | |
| *H01M 8/04* | (2006.01) | |
| *H01M 8/02* | (2006.01) | |

(52) U.S. Cl.
CPC ........ *H01M 8/1004* (2013.01); *H01M 8/04201* (2013.01); *Y02E 60/50* (2013.01); *Y02E 60/521* (2013.01); *H01M 8/0247* (2013.01); *H01M 8/0258* (2013.01); *H01M 2008/1095* (2013.01)

(58) Field of Classification Search
CPC .......... H01M 8/1004; H01M 8/04201; H01M 8/0258; H01M 8/0247; H01M 2008/1095; Y02E 60/50; Y02E 60/521
See application file for complete search history.

(56) References Cited

U.S. PATENT DOCUMENTS

| | | | |
|---|---|---|---|
| 8,034,506 B2 | 10/2011 | Kikuchi et al. | |
| 2009/0239129 A1* | 9/2009 | Seido et al. | ..................... 429/39 |
| 2010/0119907 A1* | 5/2010 | Shibata et al. | .................. 429/30 |
| 2011/0159407 A1* | 6/2011 | Chen et al. | ..................... 429/514 |

FOREIGN PATENT DOCUMENTS

| | | |
|---|---|---|
| DE | 10 2007 009 905 A1 | 9/2007 |
| JP | 2006-216491 A | 8/2006 |

OTHER PUBLICATIONS

DE Search Report dated Jan. 21, 2014 issued over the corresponding German Patent Application No. 10 2013 204 608.1 and English translation thereof.
DE Office Action dated Jan. 24, 2014 issued over the corresponding German Patent Application No. 10 2013 204 608.1 and the English translation thereof.

* cited by examiner

*Primary Examiner* — Raymond Alejandro
(74) *Attorney, Agent, or Firm* — Carrier Blackman & Associates, P.C.; Joseph P. Carrier; William D. Blackman

(57) ABSTRACT

A fuel cell is formed by sandwiching a membrane electrode assembly between a first separator and a second separator. An outlet connection channel connecting a fuel gas flow field with a fuel gas discharge passage is provided in the first separator. The outlet connection channel has a plurality of discharge holes extending through the first separator. The discharge holes are arranged in the direction of gravity. The discharge hole at the lowermost position has an opening elongated downward to have an opening area larger than opening areas of the other discharge holes above and adjacent to the discharge hole at the lowermost position.

6 Claims, 7 Drawing Sheets

FUEL CELL

CROSS-REFERENCE TO RELATED APPLICATION

This application is based upon and claims the benefit of priority from Japanese Patent Application No. 2012-061601 filed on Mar. 19, 2012, the contents of which are incorporated herein by reference.

BACKGROUND OF THE INVENTION

1. Field of the Invention

The present invention relates to a fuel cell formed by stacking a membrane electrode assembly and separators together upright in a horizontal direction. The membrane electrode assembly includes a pair electrodes and an electrolyte membrane interposed between the electrodes.

2. Description of the Related Art

For example, a solid polymer electrolyte fuel cell employs a solid polymer electrolyte membrane. The solid polymer electrolyte membrane is a polymer ion exchange membrane, and interposed between an anode and a cathode to form a membrane electrode assembly (MEA). The membrane electrode assembly and a pair of separators sandwiching the membrane electrode assembly make up a power generation cell (unit cell) for generating electricity. In use, typically, several tens to several hundreds of the power generation cells are stacked together to form a fuel cell stack, e.g., mounted in a vehicle.

In the fuel cell, so-called internal manifolds are often adopted for supplying a fuel gas and an oxygen-containing gas as reactant gases to the anode and the cathode of each of the stacked power generation cells.

The internal manifold includes reactant gas supply passages (fuel gas supply passage, oxygen-containing gas supply passage) and reactant gas discharge passages (fuel gas discharge passage, oxygen-containing gas discharge passage) extending through the power generation cells in the stacking direction. The reactant gas supply passages and the reactant gas discharge passages are connected respectively to inlets and outlets of reactant gas flow fields (fuel gas flow field, oxygen-containing gas flow field) for supplying the reactant gases along electrode surfaces.

In some cases, the recant gas supply passages and the reactant gas discharge passages may be connected to the reactant gas flow fields through connection channels each having a plurality of through holes for allowing the reactant gases to flow smoothly and uniformly.

In this regard, for example, as shown in FIG. 7, as disclosed in Japanese Laid-Open Patent Publication No. 2006-216491 (hereinafter referred to as the prior art), an anode side plate (separator) includes a fuel gas supply manifold forming section 1a, a fuel gas discharge manifold forming section 1b, an oxygen-containing gas supply manifold forming section 2a, an oxygen-containing gas discharge manifold forming section 2b, a coolant supply manifold forming section 3a, and a coolant discharge manifold forming section 3b.

Further, the anode side plate includes a plurality fuel gas supply holes 4a arranged in a line and on the center side of the fuel gas supply manifold forming section 1a, and a plurality of fuel gas discharge holes 4b arranged in a line and on the center side of the fuel gas discharge manifold forming section 1b.

The anode side plate includes a corrugated power generation area which faces an MEA when components of the fuel cell are assembled together. The anode side plate has a fuel gas flow field forming section 5 on its surface facing the MEA, and a coolant flow field forming section 6 on its surface opposite to the surface where the fuel gas flow field forming section 5 is provided. Grooves of the coolant flow field forming section 6 and grooves of the fuel gas flow field forming section 5 are formed alternately in the vertical direction.

SUMMARY OF THE INVENTION

In the prior art, a seal member (not shown) for preventing leakage of a fuel gas, an oxygen-containing gas, and a coolant (i.e., for providing sealing performance) is provided on the surfaces of the anode side plate. The fuel gas supply holes 4a and the fuel gas discharge holes 4b are connected to the fuel gas supply manifold forming section 1a and the fuel gas discharge manifold forming section 1b on one surface of the anode side plate through the seal member, and connected to the fuel gas flow field forming section 5 on the other surface of the anode side plate through the seal member.

In this regard, if there are gaps between the fuel gas supply hole 4a and the fuel gas discharge hole 4b at the lowermost positions and lower portions of the seal member, relatively large amounts of water tend to be retained in the lower portions of the seal member. Therefore, a large differential pressure is required for the smooth flow of the water, resulting in change in the flow rate of the fuel gas. As a result, the power generation stability is degraded. Further, in the case where the amount of water retained at the fuel gas supply holes 4a as stagnant water is large, when the flow rate of the fuel gas changes, the amount of water injected to the power generation area is increased, and the power generation stability is degraded. Further, when the temperature is low, the stagnant water tends to be frozen easily, and the fuel cell may be damaged undesirably.

The present invention has been made to solve the problem of this type, and an object of the present invention is to provide a fuel cell having simple and economical structure in which it is possible to suppress stagnation of water at a position adjacent to a connection channel connecting a reactant gas flow field and a reactant gas passage, and to improve the power generation stability.

The present invention relates to a fuel cell formed by stacking a membrane electrode assembly and separators together upright in a horizontal direction. The membrane electrode assembly includes a pair of electrodes and an electrolyte membrane interposed between the electrodes. A reactant gas flow field for supplying a reactant gas along an electrode surface and a reactant gas passage for flowing the reactant gas in the stacking direction of the membrane electrode assembly and the separator are formed in the separator.

In the fuel cell, a connection channel connecting the reactant gas flow field and the reactant gas passage is provided. The connection channel has a plurality of through holes extending through the separator.

A first channel seal is provided on one surface of the separator around the reactant gas passage and the through holes, and a second channel seal is provided on the other surface of the separator around the through holes and the reactant gas flow field. The through holes are arranged in a direction of gravity, and among the through holes, one through hole at the lowermost position has an opening elongated downward to have an opening area larger than opening areas of other through holes which are positioned above and adjacent to the one through hole at the lowermost position.

In the present invention, of a plurality of through holes arranged in the direction of gravity, a through hole at the lowermost position has an opening elongated downward to have an opening area larger than opening areas of other through holes above and adjacent to the through hole at the lowermost position. In the structure, the space where the water is retained is minimized as much as possible between the through hole at the lowermost position and the first channel seal or the second channel seal. Further, since the opening area of the through hole at the lowermost position is large, the water is discharged smoothly, and the gas flow rate is stabilized.

Thus, with simple and economical structure, water stagnation at the position adjacent to the connection channel connecting the reactant gas flow field and the reactant gas passage is suppressed, and it becomes possible to improve the power generation stability easily.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
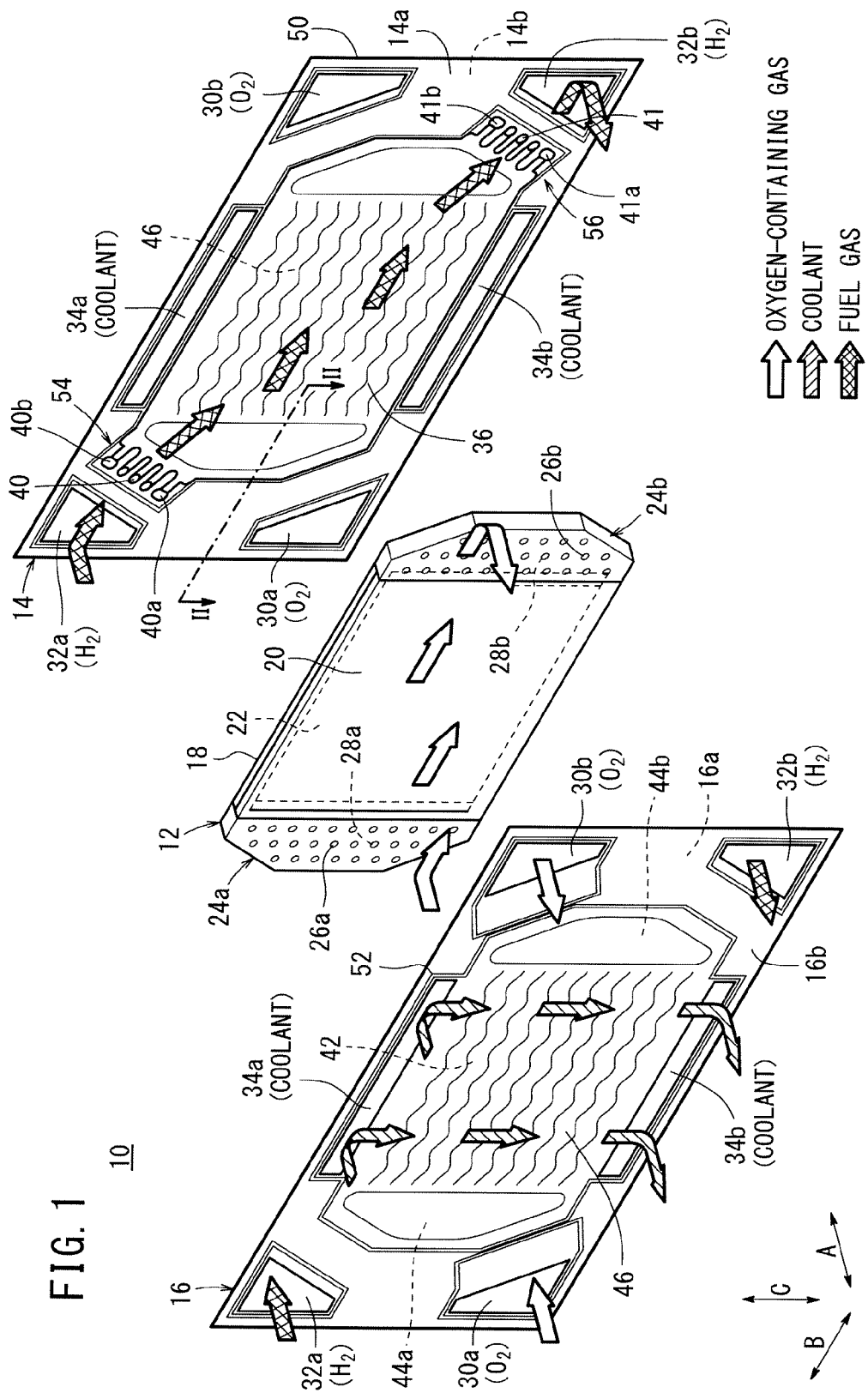
FIG. 1 is an exploded perspective view showing main components of a fuel cell according to an embodiment of the present invention.
Figure 2:
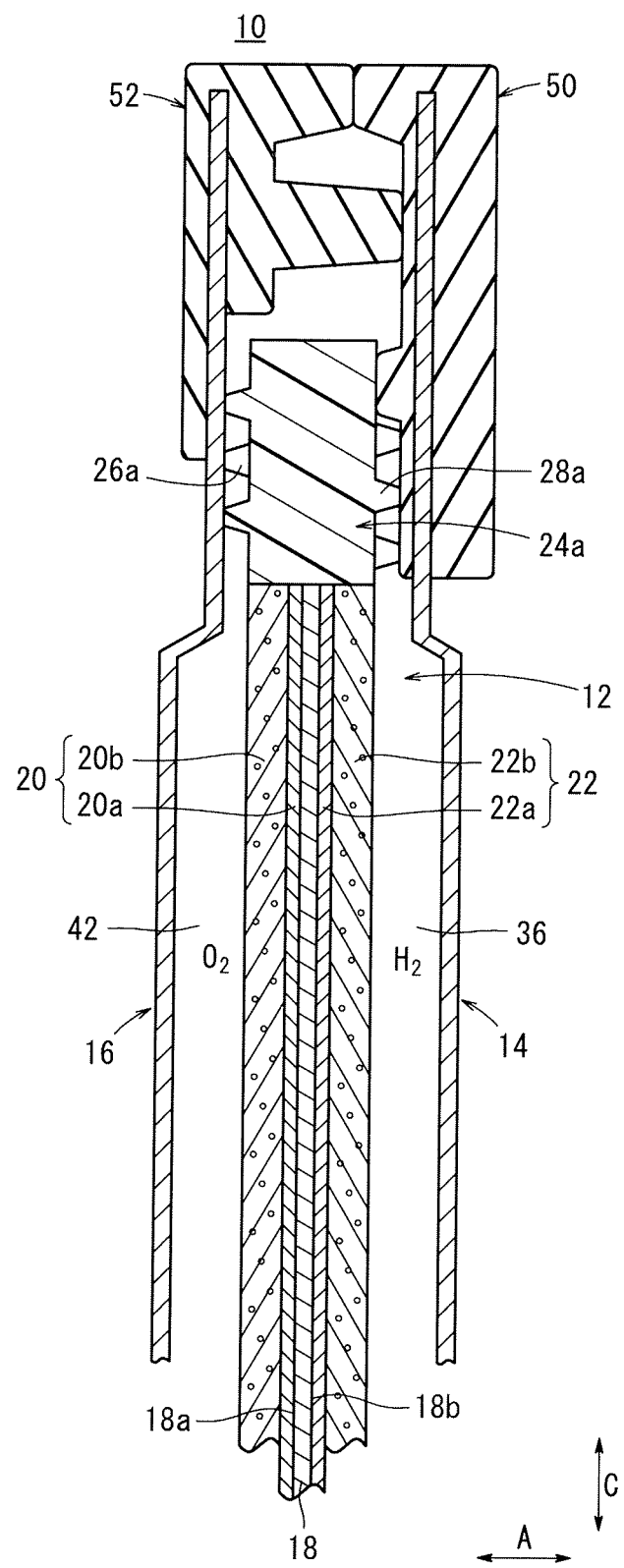
FIG. 2 is a cross sectional view showing the fuel cell, taken along a line II-II in FIG. 1.

A plurality of fuel cells 10 according to an embodiment of the present invention shown in FIGS. 1 and 2 are stacked together upright in a horizontal direction indicated by an arrow A to form a stack (e.g., fuel cell stack mounted in a vehicle).

The fuel cell 10 is formed by sandwiching a membrane electrode assembly 12 between a first separator 14 and a second separator 16. Each of the first separator 14 and the second separator 16 has a laterally elongated (or longitudinally elongated) rectangular shape. For example, the first separator 14 and the second separator 16 are each formed by pressing a metal plate into a corrugated plate shape. Such a metal plate includes steel plates, stainless steel plates, aluminum plates, and plated steel sheets, and the metal plates may have anti-corrosive surfaces by surface treatment. Alternatively, carbon members may be used as the first separator 14 and the second separator 16.

The membrane electrode assembly 12 having a rectangular (or square) shape includes a cathode 20, an anode 22, and a solid polymer electrolyte membrane 18 interposed between the cathode 20 and the anode 22 as shown in FIG. 2. The solid polymer electrolyte membrane 18 is formed by impregnating a thin membrane of perfluorosulfonic acid with water, for example. A fluorine based electrolyte may be used as the solid polymer electrolyte membrane 18. Alternatively, an HC (hydrocarbon) based electrolyte may be used as the solid polymer electrolyte membrane 18.

The cathode 20 includes a first electrode catalyst layer 20a joined to one surface 18a of the solid polymer electrolyte membrane 18 and a first gas diffusion layer 20b stacked on the first electrode catalyst layer 20a. The anode 22 includes a second electrode catalyst layer 22a joined to the surface 18b of the solid polymer electrolyte membrane 18, and a second gas diffusion layer 22b stacked on the second electrode catalyst layer 22a.

The first electrode catalyst layer 20a and the second electrode catalyst layer 22a have the same outer size. At both ends in the longitudinal direction, the outer sizes of the first electrode catalyst layer 20a and the second electrode catalyst layer 22a are the same as the outer size of the solid polymer electrolyte membrane 18. At both ends in the lateral direction, the outer sizes of the first electrode catalyst layer 20a and the second electrode catalyst layer 22a are smaller than the outer size of the solid polymer electrolyte membrane 18 (see FIG. 1).

The outer size of the first gas diffusion layer 20b is the same as the outer size of the solid polymer electrolyte membrane 18 (see FIG. 2). At both ends in the longitudinal direction, the outer size of the second gas diffusion layer 22b is the same as the outer size of the solid polymer electrolyte membrane 18. At both ends in the lateral direction, the outer size of the second gas diffusion layer 22b is smaller than the outer sizes of the solid polymer electrolyte membrane 18 and the first gas diffusion layer 20b.

Each of the first electrode catalyst layer 20a and the second electrode catalyst layer 22a is formed as follow. Carbon black supporting platinum particles is formed as catalyst particles. As an ion conductive binder, polymer electrolyte is used. Catalyst paste formed by mixing the catalyst particles uniformly in the solution of this polymer electrolyte is printed, applied, or transferred on both surfaces 18a, 18b of the solid polymer electrolyte membrane 18 to form the first electrode catalyst layer 20a and the second electrode catalyst layer 22a.

Each of the first gas diffusion layer 20b and the second gas diffusion layer 22b is formed by applying an underlayer containing carbon black and PTFE (polytetrafluoroethylene) particles onto the catalyst layer of the carbon paper.

Resin members 24a, 24b are formed integrally with the membrane electrode assembly 12. The resin members 24a, 24b are formed integrally with the short sides of the membrane electrode assembly 12, e.g., by welding, adhesion, or integral molding. For example, each of the resin members 24a, 24b is made of PPS (poly phenylene sulfide), PPA (polyphthalamide), PEN (polyethylene naphtalate), PES (polyethersulfone), LCP (liquid crystal polymer), PVDF (polyvinylidene fluoride), a silicone rubber, a fluoro-rubber, or an EPDM rubber (ethylene propylene diene monomer).

As shown in FIG. 1, the resin member 24a has an inlet buffer 26a corresponding to the inlet side of the oxygen-containing gas flow field 42, described later, on its surface facing the second separator 16. The resin member 24b has an outlet buffer 26b corresponding to the outlet side of the oxygen-containing gas flow field 42 on its surface facing the second separator 16. The inlet buffer 26a and the outlet buffer 26b are formed by a plurality of projections.

The resin member 24a has an inlet buffer 28a corresponding to the inlet side of a fuel gas flow field 36, described later, on its surface facing the first separator 14. The resin member 24b has an outlet buffer 28b corresponding to the outlet side of the fuel gas flow field 36 on its surface facing the first separator 14. The inlet buffer 28a and the outlet buffer 28b are formed by a plurality of projections.

At one end of the fuel cell 10 in a longitudinal direction indicated by an arrow B, an oxygen-containing gas supply passage (reactant gas passage) 30a for supplying an oxygen-containing gas, and a fuel gas supply passage (reactant gas passage) 32a for supplying a fuel gas such as a hydrogen-containing gas are provided. The oxygen-containing gas supply passage 30a and the fuel gas supply passage 32a extend through the fuel cell 10 in the direction indicated by the arrow A.

At the other end of the fuel cell 10 in the longitudinal direction, a fuel gas discharge passage (reactant gas passage) 32b for discharging the fuel gas and an oxygen-containing gas discharge passage (reactant gas passage) 30b for discharging the oxygen-containing gas are provided. The fuel gas discharge passage 32b and the oxygen-containing gas discharge passage 30b extend through the fuel cell 10 in the direction indicated by the arrow A.

At an upper end of the fuel cell 10 in the lateral direction indicted by the arrow C, a coolant supply passage 34a for supplying a coolant is provided. At a lower end of the fuel cell 10 in the lateral direction, a coolant discharge passage 34b for discharging the coolant is provided. The coolant supply passage 34a and the coolant discharge passage 34b extend through the fuel cell 10 in the direction indicated by the arrow A.

Figure 3:
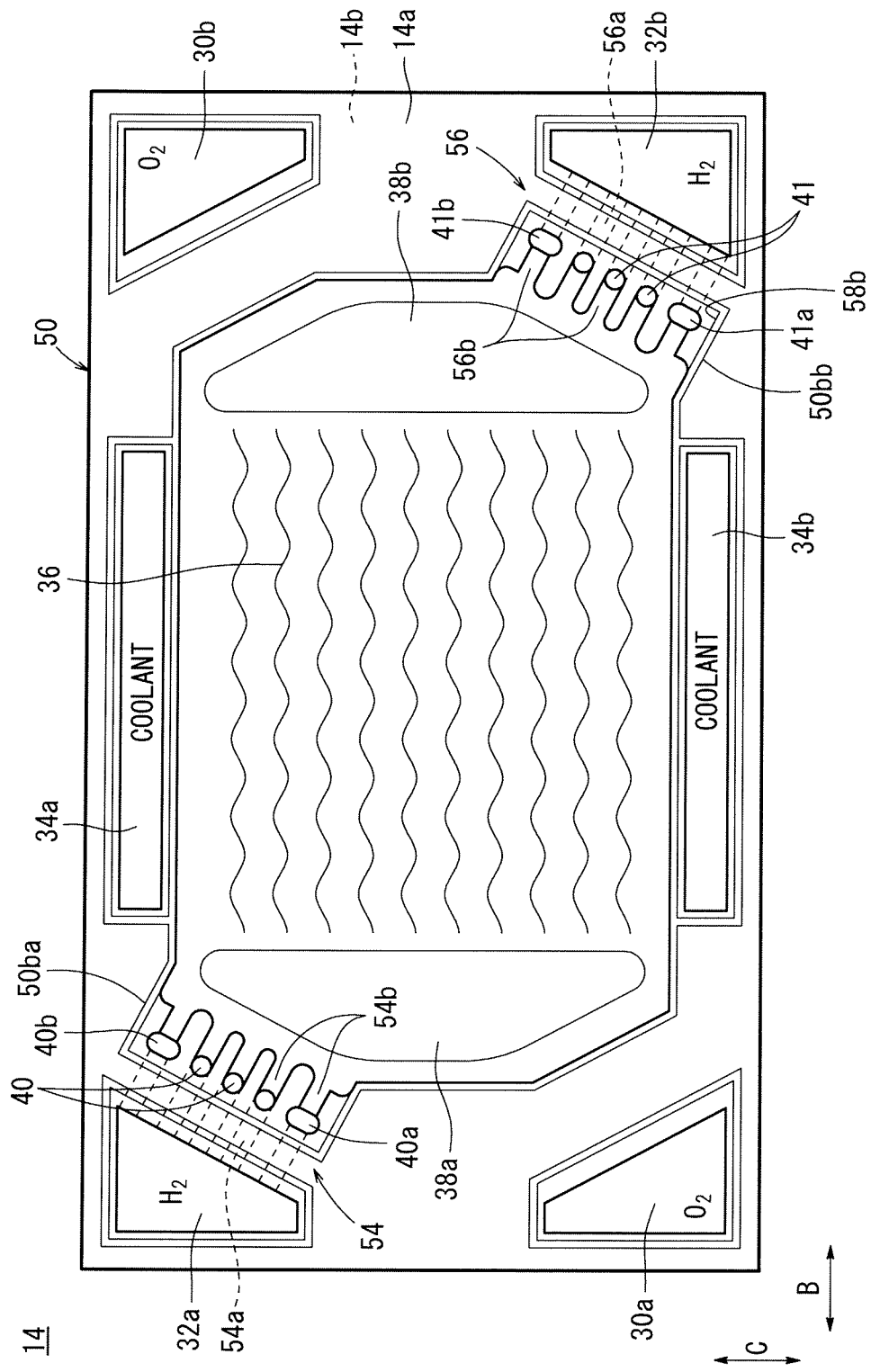
FIG. 3 is a view showing one surface of a first separator of the fuel cell.

As shown in FIG. 3, the first separator 14 has a fuel gas flow field (reactant gas flow field) 36 on its surface 14a facing the membrane electrode assembly 12. The fuel gas flow field 36 is connected to the fuel gas supply passage 32a and the fuel gas discharge passage 32b. The fuel gas flow field 36 includes a plurality of corrugated flow grooves extending in the direction indicated by the arrow B.

At the inlet of the fuel gas flow field 36, a substantially flat inlet buffer area 38a is provided. The inlet buffer area 38a contacts the inlet buffer 28a provided on the resin member 24a.

An end of the inlet buffer area 38a that is adjacent to the fuel gas supply passage 32a is connected to a plurality of supply holes (through holes) 40. The supply holes 40 are arranged in the direction of gravity, specifically, arranged downward in the direction of gravity with inclination in a direction away from the fuel gas flow field 36. The supply holes 40 are arranged in parallel with inclination of the inner wall surface of the fuel gas supply passage 32a. That is, in the fuel gas supply passage 32a, the inner wall surface is inclined for supplying the fuel gas uniformly in the width direction of the fuel gas flow field 36 indicated by the arrow C, and the supply holes 40 are provided along the inner wall surface.

Among the supply holes 40, the supply hole 40a at the lowermost position has an opening elongated downward to have an opening area larger than opening areas of the other supply holes 40 above and adjacent to the supply hole 40a at the lowermost position. Specifically, each of the supply holes 40 has a circular shape, and the supply hole 40a has an oval shape (elliptical shape). Preferably, the supply hole 40b at the uppermost position has the same shape (oval shape or elliptical shape) as the supply hole 40a in order to maintain the uniform flow distribution balance with the supply hole 40a.

At the outlet of the fuel gas flow field 36, a substantially flat outlet buffer area 38b is provided. The outlet buffer area 38b contacts the outlet buffer 28b provided on the resin member 24b. An end of the outlet buffer area 38b that is adjacent to the fuel gas discharge passage 32b is connected to a plurality of discharge holes (through holes) 41.

The discharge holes 41 are arranged in the direction of gravity, specifically, arranged downward in the direction of gravity with inclination in a direction closer to the fuel gas flow field 36. The discharge holes 41 are arranged in parallel with inclination of the inner wall surface of the fuel gas discharge passage 32b. That is, in the fuel gas discharge passage 32b, the inner wall surface is inclined for discharging the fuel gas uniformly in the width direction of the fuel gas flow field 36 indicated by the arrow C, and the discharge holes 41 are provided along the inner wall surface.

Among the discharge holes 41, the discharge hole 41a at the lowermost position has an opening elongated downward to have an opening area larger than opening areas of the other discharge holes 41 above and adjacent to the discharge hole 41a at the lowermost position. Specifically, each of the discharge holes 41 has a circular shape, and the discharge hole 41a has an oval shape (elliptical shape). The discharge hole 41b at the uppermost position has the same shape (oval shape or elliptical shape) as the discharge hole 41a in order to maintain the uniform flow distribution balance with the discharge hole 41a.

As shown in FIG. 1, the second separator 16 has an oxygen-containing gas flow field 42 on its surface 16a facing the membrane electrode assembly 12. The oxygen-containing gas flow field 42 is connected to the oxygen-containing gas supply passage 30a and the oxygen-containing gas discharge passage 30b. The oxygen-containing gas flow field 42 includes a plurality of corrugated flow grooves extending in the direction indicated by the arrow B.

At the inlet of the oxygen-containing gas flow field 42, a substantially flat inlet buffer area 44a is provided. The inlet buffer area 44a contacts the inlet buffer 26a provided on the resin member 24a. At the outlet of the oxygen-containing gas flow field 42, an outlet buffer area 44b is provided. The outlet buffer area 44b contacts the outlet buffer 26b provided at the lower end of the resin member 24b.

A coolant flow field 46 is provided between the surface 14b of the first separator and the surface 16b of the second separator 16 that are adjacent to each other. The coolant flow field 46 extends in the direction indicated by the arrow C so as to connect the coolant supply passage 34a with the coolant discharge passage 34b.

As shown in FIGS. 1 and 2, a first seal member 50 is formed integrally with the surfaces 14a, 14b of the first separator 14, so as to extend along the outer circumferential end of the first separator 14. A second seal member 52 is formed integrally with the surfaces 16a, 16b of the second separator 16, so as to extend along the outer circumferential end of the second separator 16.

Each of the first seal member 50 and the second seal members 52 comprises an elastic seal member which is made of seal material, cushion material, or packing material such as an EPDM, an NBR (nitrile butadiene rubber), a fluoro-rubber, a silicone rubber, a fluorosilicone rubber, a butyl rubber, a natural rubber, a styrene rubber, a chloroprene rubber, or an acrylic rubber.

Figure 4:
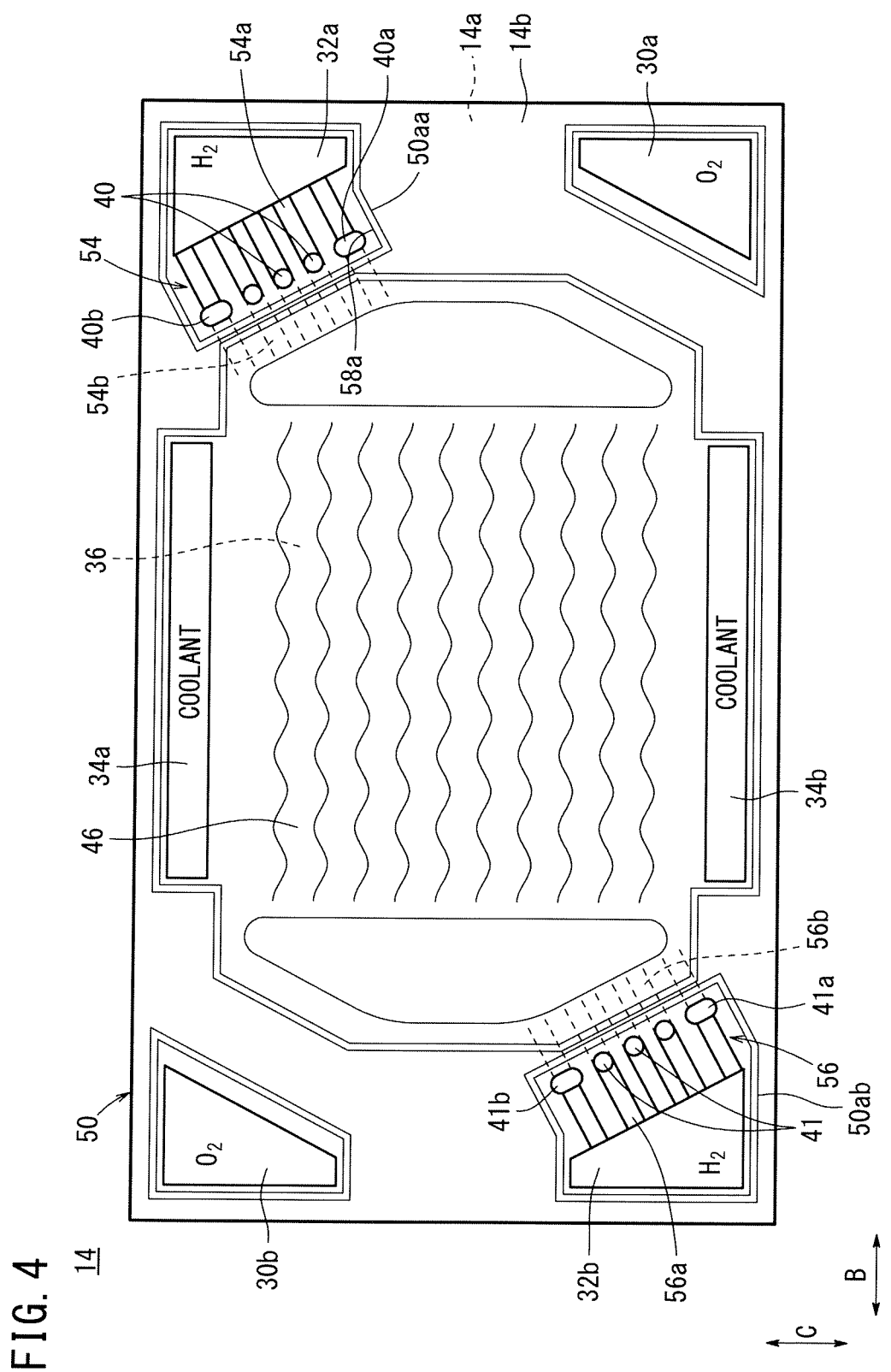
FIG. 4 is a view showing the other surface of the first separator.

As shown in FIGS. 3 and 4, an inlet connection channel 54 connecting the fuel gas flow field 36 and the fuel gas supply passage 32a and an outlet connection channel 56 connecting the fuel gas flow field 36 and the fuel gas discharge passage 32b are provided on the surfaces 14a, 14b of the first separator 14.

The inlet connection channel 54 includes a plurality of supply holes 40, 40a, and 40b (hereinafter simply referred to as the supply holes 40). As shown in FIG. 4, a first channel seal 50aa as part of the first seal member 50 is provided on the surface 14b of the first separator 14, around the fuel gas supply passage 32a and the supply holes 40.

As shown in FIG. 3, a second channel seal 50ba as part of the first seal member 50 is provided on the surface 14a of the first separator 14, around the supply holes 40 and the fuel gas flow field 36. The first channel seal 50aa, the supply holes 40, and the second channel seal 50ba form the inlet connection channel 54.

In the inlet connection channel 54, as shown in FIG. 4, the first channel seal 50aa protrudes downward at a position below and adjacent to the lowermost supply hole 40a to form a recess 58a, and the lower end of the first channel seal 50aa is inclined downward toward the fuel gas flow field 36.

The inlet connection channel 54 includes a first channel section 54a and a second channel section 54b. The first channel section 54a is formed by cutting out the first seal member 50, and provided on the surface 14b of the first separator 14. One end of the first channel section 54a is connected to the fuel gas supply passage 32a, and the other end of the first channel section 54a is connected to the supply holes 40. One end of the second channel section 54b is connected to the fuel gas flow field 36, and the other end of the second channel section 54b is connected to the supply holes 40. The first channel section 54a and the second channel section 54b are inclined downward from the horizontal direction toward the fuel gas flow field 36.

The outlet connection channel 56 includes a plurality of discharge holes 41, 41a, and 41b (hereinafter simply referred to as the discharge holes 41). As shown in FIG. 4, a first channel seal 50ab as part of the first seal member 50 is provided on the surface 14b of the first separator 14, around the fuel gas discharge passage 32b and the discharge holes 41.

As shown in FIG. 3, a second channel seal 50bb as part of the first seal member 50 is provided on the surface 14a of the first separator 14 around the discharge holes 41 and the fuel gas flow field 36. The first channel seal 50ab, the discharge holes 41, and the second channel seal 50bb form the outlet connection channel 56.

As shown in FIG. 3, in the outlet connection channel 56, the second channel seal 50bb protrudes downward at a position below and adjacent to the lowermost discharge hole 41a to form a recess 58b, and the lower end of the second channel seal 50bb is inclined upward toward the fuel gas flow field 36.

The outlet connection channel 56 includes a first channel section 56a and a second channel section 56b. The first channel section 56a is formed by cutting out the first seal member 50, and provided on the surface 14b of the first separator 14. One end of the first channel section 56a is connected to the fuel gas discharge passage 32b, and the other end of the first channel section 56a is connected to the discharge holes 41. One end of the second channel section 56b is connected to the fuel gas flow field 36, and the other end of the second channel section 56b is connected to the discharge holes 41. The first channel section 56a and the second channel section 56b are inclined upward from the horizontal direction toward the fuel gas flow field 36.

Operation of the fuel cell 10 will be described below.

Firstly, as shown in FIG. 1, an oxygen-containing gas is supplied to the oxygen-containing gas supply passage 30a, and a fuel gas such as a hydrogen containing gas is supplied to the fuel gas supply passage 32a. Further, a coolant such as pure water, ethylene glycol, oil or the like is supplied to the coolant supply passage 34a.

Thus, the oxygen-containing gas flows from the oxygen-containing gas supply passage 30a into the oxygen-containing gas flow field 42 of the second separator 16. The oxygen-containing gas moves in the direction indicated by the arrow B, and the oxygen-containing gas is supplied to the cathode 20 of the membrane electrode assembly 12 for inducing an electrochemical reaction at the cathode 20.

In the meanwhile, the fuel gas from the fuel gas supply passage 32a flows through the first channel section 54a, the supply holes 40a, and the second channel section 54b of the first separator 14, i.e., through the inlet connection channel 54, and the fuel gas is supplied into the fuel gas flow field 36. The fuel gas moves in the direction indicated by the arrow B along the fuel gas flow field 36, and the fuel gas is supplied to the anode 22 of the membrane electrode assembly 12 for inducing an electrochemical reaction at the anode 22.

Thus, in each of the membrane electrode assemblies 12, the oxygen-containing gas supplied to the cathode 20, and the fuel gas supplied to the anode 22 are consumed in the electrochemical reactions at catalyst layers of the cathode 20 and the anode 22 for generating electricity.

Then, the oxygen-containing gas consumed at the cathode 20 is discharged along the oxygen-containing gas discharge passage 30b in the direction indicated by the arrow A. Likewise, the fuel gas consumed at the anode 22 flows through the second channel section 56b, the discharge holes 41, and the first channel section 56a, i.e., through the outlet connection channel 56, and into the fuel gas discharge passage 32b. Then, the fuel gas is discharged through the fuel gas discharge passage 32b.

Further, the coolant supplied to the coolant supply passage 34a flows into the coolant flow field 46 between the first separator 14 and the second separator 16, and then, the coolant flows in the direction indicated by the arrow C. After the coolant cools the membrane electrode assembly 12, the coolant is discharged through the coolant discharge passage 34b.

Figure 5:
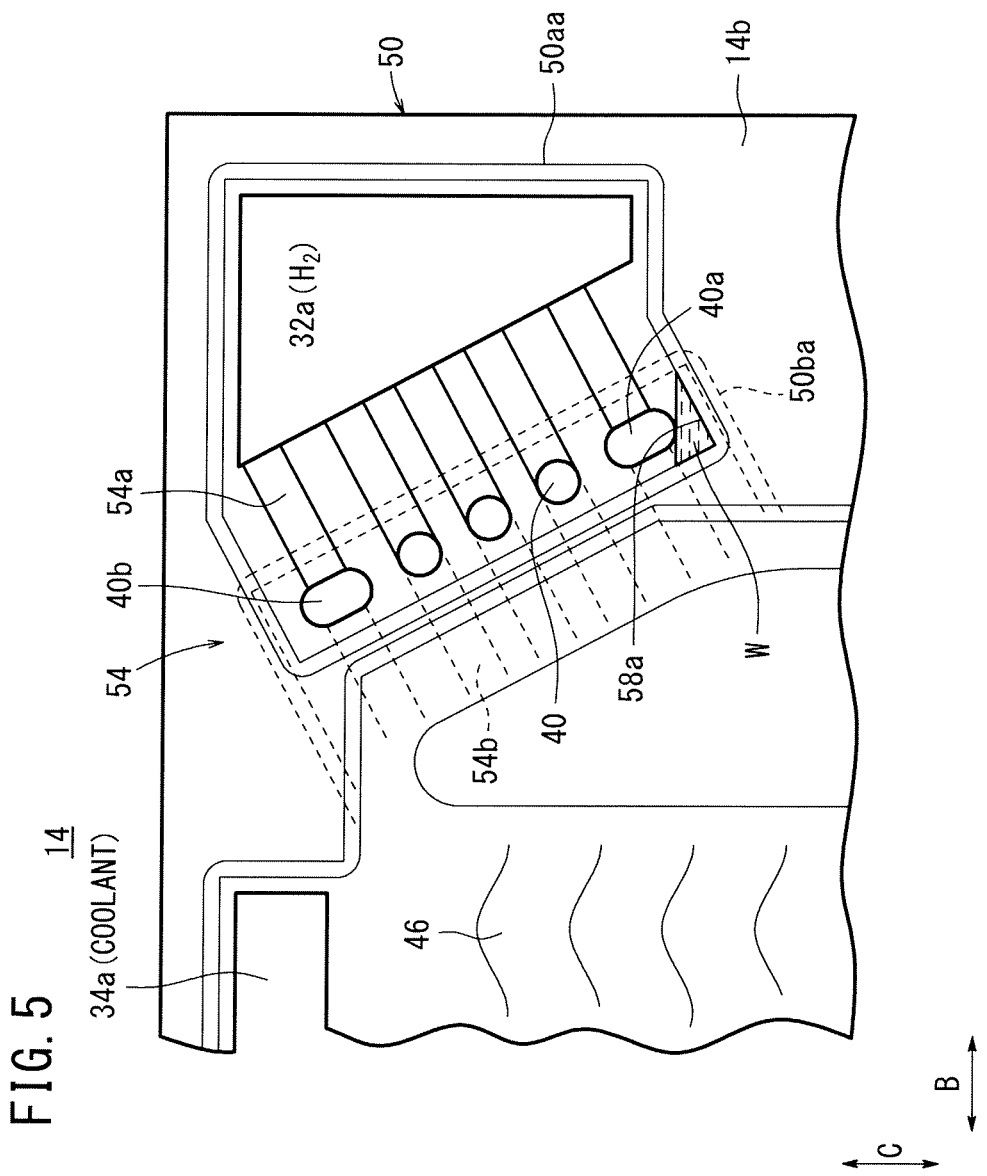
FIG. 5 is a view showing an inlet connection channel of the first separator.

As shown in FIG. 5, the first channel seal 50aa is provided around the fuel gas supply passage 32a and the supply holes 40, and the first channel seal 50aa forms the recess 58a at a position below and adjacent to the lowermost supply hole 40a. In the structure, the water W tends to be retained in the recess 58a.

In the embodiment of the present invention, the supply hole 40a at the lowermost position has an opening elongated downward to have an opening area larger than opening areas of the other supply holes 40. Specifically, the supply holes 40 have the circular shape, and the supply hole 40a has the oval (or elliptical) shape.

Therefore, the water level in the recess 58a is much lower in comparison with the case where the circular supply hole 40 is provided at the lowermost position. Thus, the space where water stagnation occurs in the recess 58a is reduced as much as possible. Further, the area of the opening the supply hole 40a at the lowermost position is larger than the areas of the openings of the other supply holes 40. In the structure, the water is discharged smoothly, and the flow rate of the fuel gas is stabilized.

Accordingly, with simple and economical structure, it becomes possible to suppress water stagnation at a position adjacent to the inlet connection channel 54 connecting the fuel gas flow field 36 and the fuel gas supply passage 32a, and it becomes possible to achieve improvement in the power generation stability easily.

Figure 6:
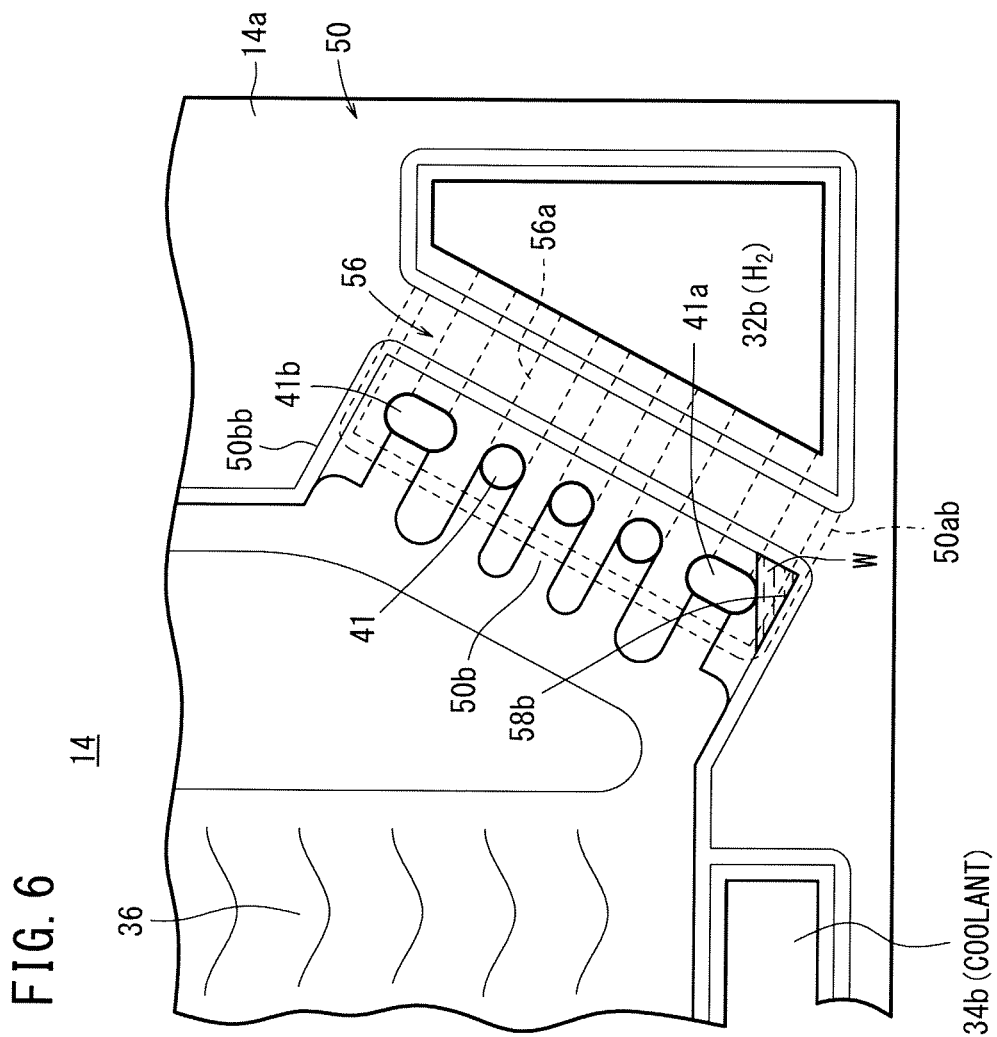
FIG. 6 is a view showing an outlet connection channel of the first separator.
Figure 7:
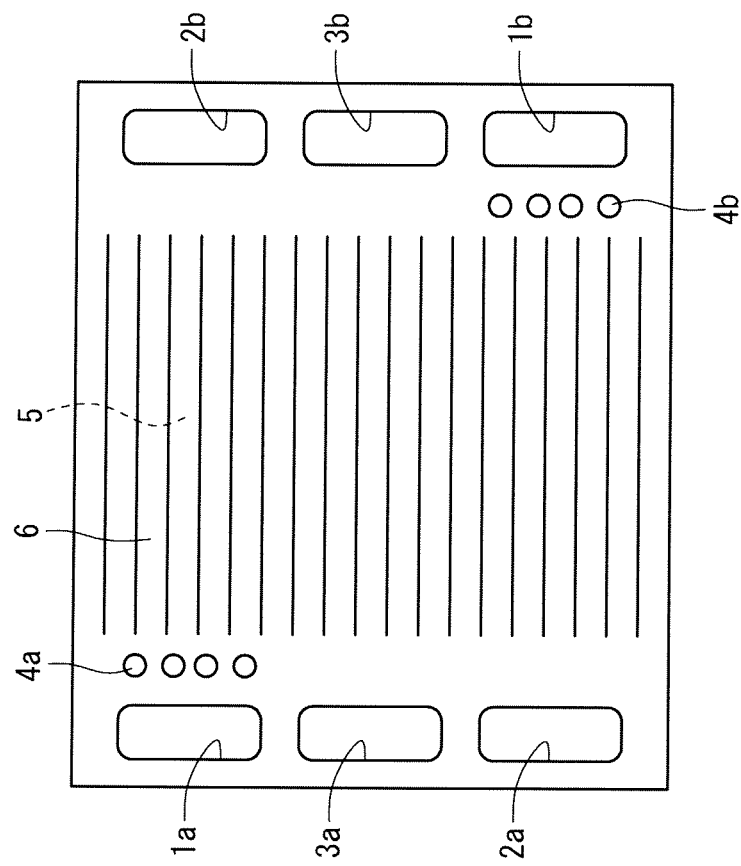
FIG. 7 is a view showing a separator disclosed in a prior art.

Further, as shown in FIG. 6, the second channel seal 50bb is provided around the discharge holes 41 and the fuel gas flow field 36, and the second channel seal 50bb forms the recess 58b at a position below and adjacent to the lowermost discharge hole 41a. In the structure, the water W tends to be retained easily in the recess 58b.

In the embodiment of the present invention, the discharge hole 41a at the lowermost position has an opening elongated downward to have an opening area larger than opening areas of the other discharge holes 41. Specifically, the discharge holes 41 have the circular shape, and the discharge hole 41a has the oval (or elliptical) shape.

Therefore, the water level in the recess 58b is much lower in comparison with the case where the circular discharge hole 41 is provided at the lowermost position.

Thus, the space where water stagnation occurs in the recess 58b is reduced as much as possible. Further, the area of the opening of the discharge hole 41a at the lowermost position is larger than the areas of the openings of the other discharge holes 41. In the structure, the water is discharged smoothly, and the flow rate of the fuel gas is stabilized.

Accordingly, with simple and economical structure, it becomes possible to suppress water stagnation at a position adjacent to the outlet connection channel 56 connecting the fuel gas flow field 36 and the fuel gas discharge passage 32b, and it becomes possible to achieve improvement in the power generation stability easily.

In the embodiment of the present invention, the inlet connection channel 54 and the outlet connection channel 56 are provided respectively between the fuel gas flow field 36 and the fuel gas supply passage 32a, and between the fuel gas flow field and the fuel gas discharge passage 32b. However, the present invention is not limited in this respect. For example, the inlet connection channel 54 and the outlet connection channel 56 may be provided respectively between the oxygen-containing gas flow field 42 the oxygen-containing gas supply passage 30a, and between the oxygen-containing gas flow field 42 and the oxygen-containing gas discharge passage 30b.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell formed by stacking a membrane electrode assembly and separators together upright in a horizontal direction, the membrane electrode assembly including a pair of electrodes and an electrolyte membrane interposed between the electrodes, a reactant gas flow field for supplying a reactant gas along an electrode surface and a reactant gas passage for flowing the reactant gas in the stacking direction of the membrane electrode assembly and the separator being formed in the separator, wherein a connection channel connecting the reactant gas flow field and the reactant gas passage is provided;

the connection channel has a plurality of through holes extending through the separator;

a first channel seal is provided on one surface of the separator around the reactant gas passage and the through holes, and a second channel seal is provided on the other surface of the separator around the through holes and the reactant gas flow field; and the through holes are arranged in a direction of gravity, and among the through holes, one through hole at the lowermost position has an opening elongated downward to have an opening area larger than opening areas of other through holes which are positioned above and adjacent to the one through hole at the lowermost position.

2. The fuel cell according to claim 1, wherein the first channel seal or the second channel seal forms a recess below and adjacent to the one through hole at the lowermost position.

3. The fuel cell according to claim 2, wherein lower ends of the first channel seal and the second channel seal are inclined downward toward the reactant gas flow field or the reactant gas passage.

4. The fuel cell according to claim 1, wherein the connection channel includes a first channel section provided on one surface of the separator and a second channel section provided on the other surface of the separator;

one end of the first channel section is connected to the reactant gas passage and the other end of the first channel section is connected to the through holes;

one end of the second channel section is connected to the reactant gas flow field and the other end of the second channel section is connected to the through holes; and the first channel section and the second channel section are inclined downward or upward from a horizontal direction.

5. The fuel cell according to claim 1, wherein the through holes are arranged with inclination toward the direction of gravity along an inner wall surface of the reactant gas passage.

6. The fuel cell according to claim 1, wherein an opening of the through hole at the uppermost position has the same shape as the opening of the through hole at the lowermost position.

* * * * *